United States Patent [19]

Fukuda et al.

[11] Patent Number: 4,523,237
[45] Date of Patent: Jun. 11, 1985

[54] METHOD AND APPARATUS FOR RECORDING AND REPRODUCING AN ANALOG SIGNAL

[75] Inventors: Shinichi Fukuda, Tokyo; Kentaro Odaka, Kawasaki, both of Japan

[73] Assignee: Sony Corporation, Tokyo, Japan

[21] Appl. No.: 485,065

[22] Filed: Apr. 14, 1983

[30] Foreign Application Priority Data

Apr. 15, 1982 [JP] Japan ................................ 57-62838

[51] Int. Cl.³ .............................................. G11B 5/60
[52] U.S. Cl. .......................................... 360/8; 360/32
[58] Field of Search ........................ 360/8, 18, 22, 32

[56] References Cited

U.S. PATENT DOCUMENTS 4,246,615 1/1981 Shirashi et al. ........................ 360/8
4,477,844 10/1984 Nakano ................................. 360/32

Primary Examiner—Vincent P. Canney
Attorney, Agent, or Firm—Lewis H. Eslinger; Alvin Sinderbrand

[57] ABSTRACT

For recording an analog signal by means of two recording heads equally spaced on a rotating drum, a magnetic tape is wrapped guide drum with an angular range of 90°, so that there are recording periods when a head is tracing the tape and free periods when neither head is tracing the tape. The analog signal to be recorded is converted to pulse code modulated (PCM) signals having real time periods longer than the recording periods. The free periods, during which neither head is in contact with the recording medium, are used to add redundant data such as parity data and a cyclic redundancy check (CRC) code to the PCM signals. The composite signal, which represents a PCM signal having the parity data and CRC code added to it, is time-base compressed to a period substantially equal to the recording periods and is recorded on the recording medium by one of the heads during its recording period. To reproduce the signal, the same head arrangement is used. The free periods are used for error correction and the error-corrected signal is time-base expanded to occupy the original or real time signal period and then reconverted into the corresponding analog signal.

23 Claims, 8 Drawing Figures

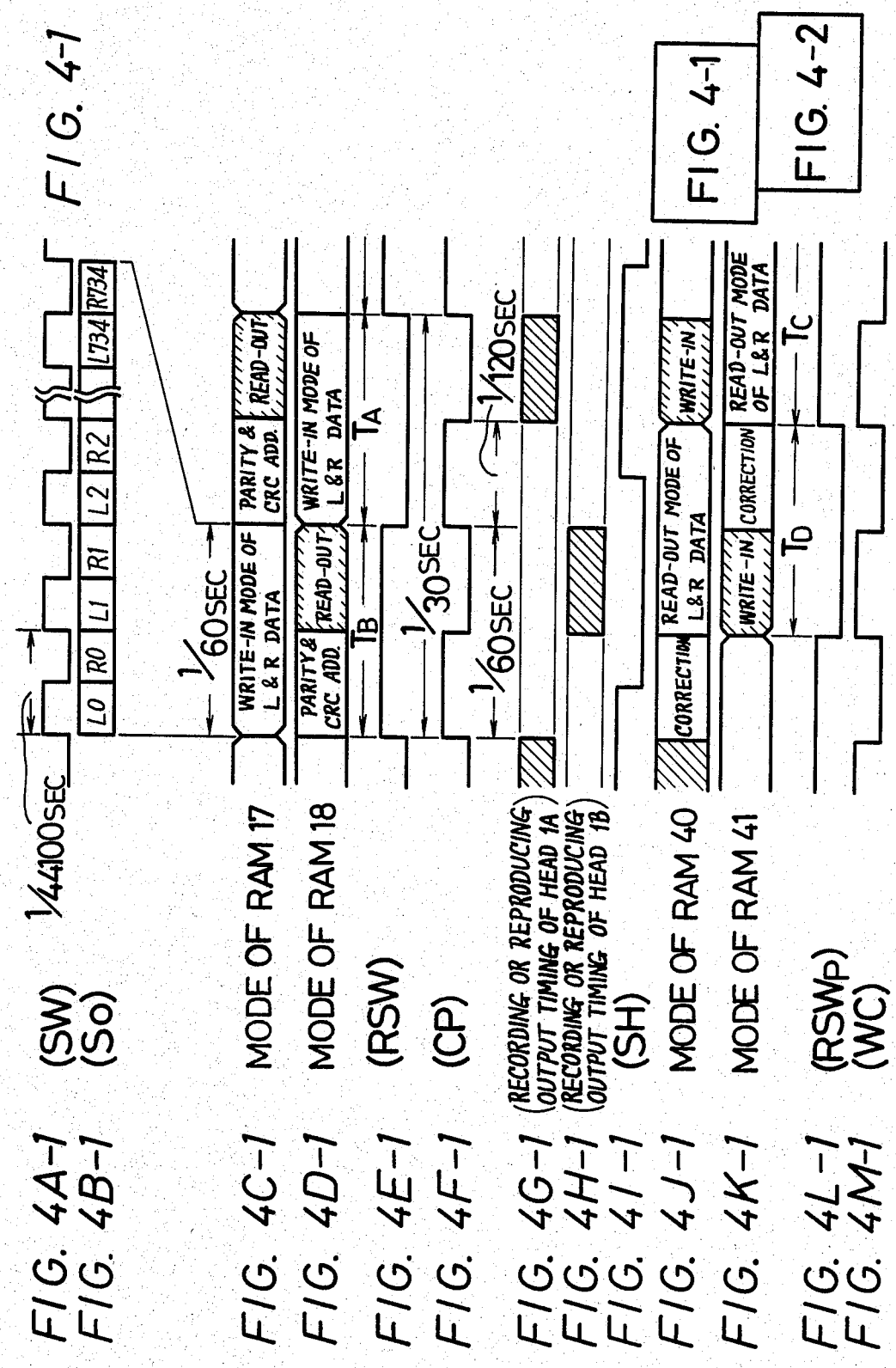

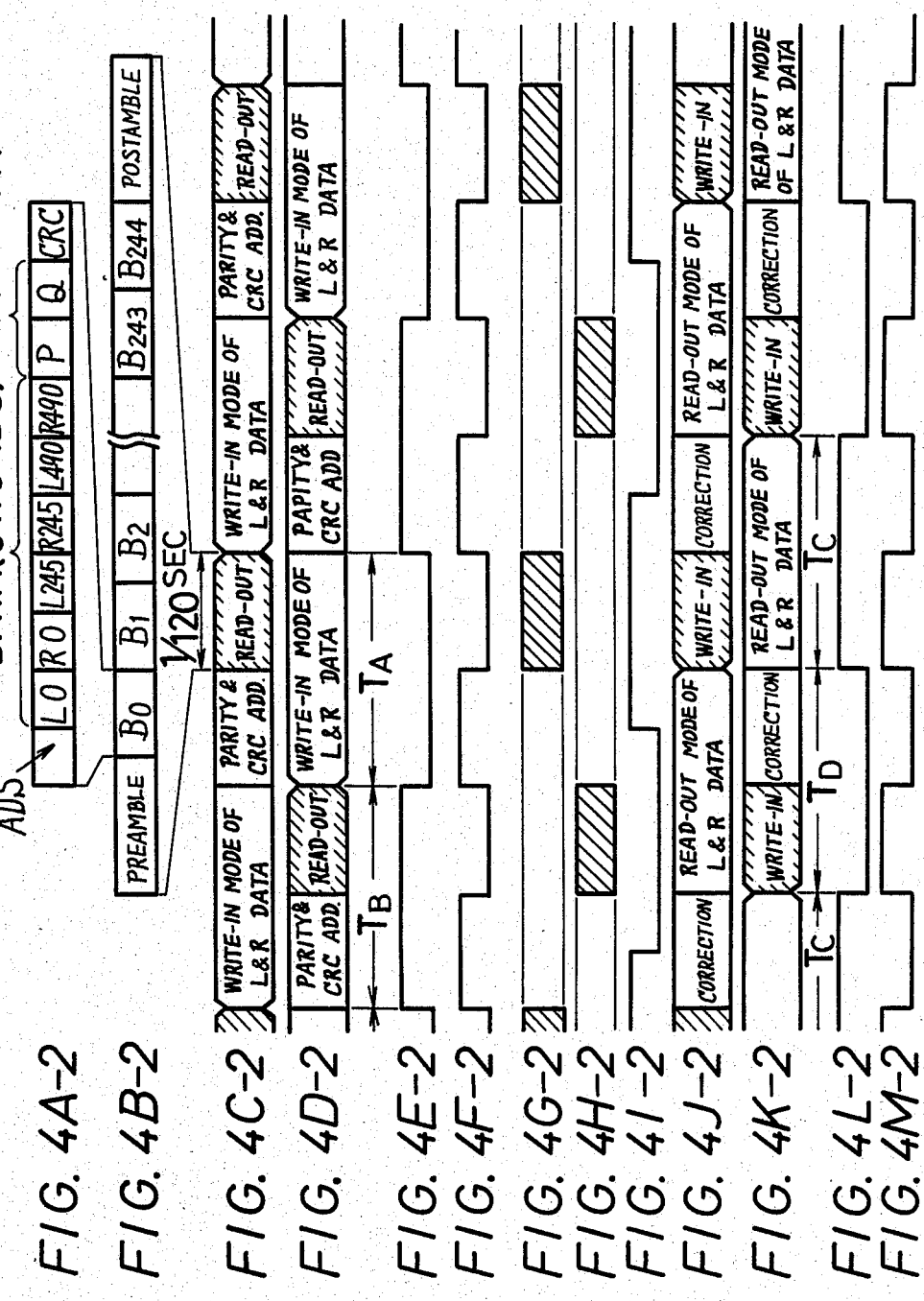

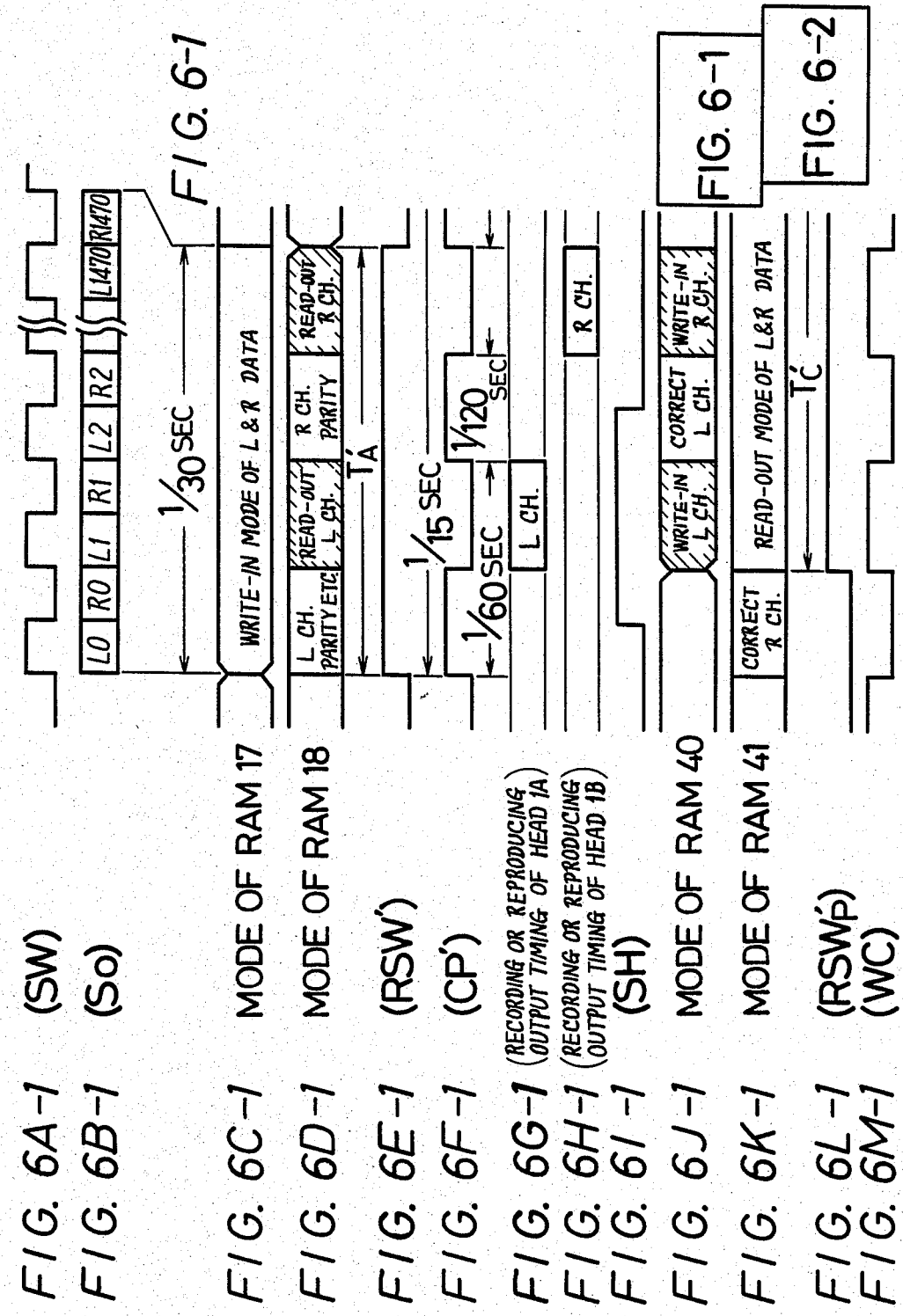

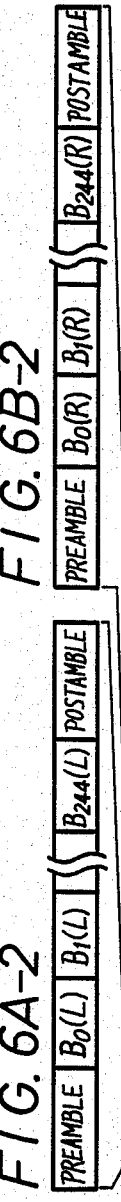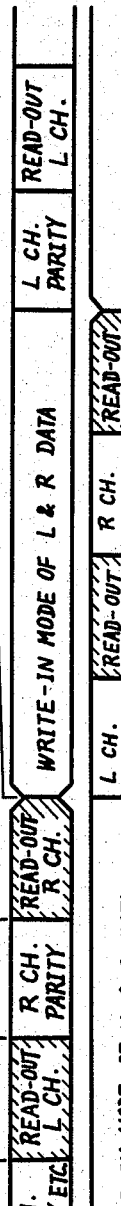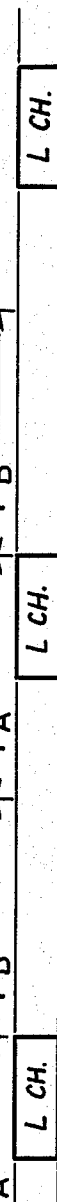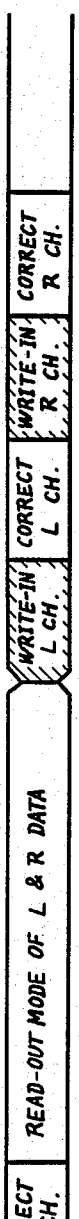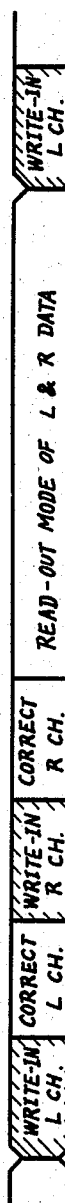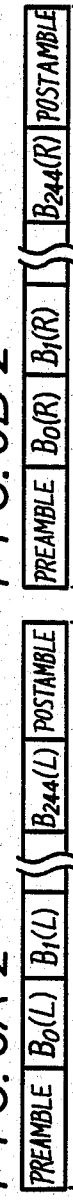

METHOD AND APPARATUS FOR RECORDING AND REPRODUCING AN ANALOG SIGNAL

BACKGROUND OF THE INVENTION

1. Field of the Invention

This invention relates generally to a method and apparatus for recording an analog signal and, more particularly, to a method and apparatus for recording an analog signal as a pulse code modulated (PCM) signal incorporating error-correcting and parity information.

2. Description of the Prior Art

Recording and reproducing an analog signal, such as an audio signal, as a pulse-code-modulated (PCM) signal permits very high-grade recording and reproducing.

Both fixed- and rotating-head systems have been proposed for recording and reproducing PCM signals. Video tape recorders (VTR) have been used as a rotating head system for recording an audio PCM signal. In a VTR having two rotary heads, the heads are normally located diametrically opposed from each other, that is, 180° apart, on a rotating tape-guide drum. A magnetic tape is wrapped about the tape-guide drum for substantially the same angular range. Each head traces or scans a track on the tape for each revolution of the drum. The audio signal to be recorded is converted into PCM data which has redundant data appended thereto to be used for error correction on reproduction. Such apparatus, for recording PCM data by means of a VTR, is disclosed in U.S. Pat. No. 4,138,694, and requires that the PCM data be converted to the format of a video signal before recording by the VTR.

In prior art apparatus using a VTR for recording PCM data, adding of parity data and error codes to the PCM signal has been accomplished by using buffer circuitry to delay the signal so that the additional information can be combined with the PCM data. However, such buffer circuits cause signal processing to become quite complex. The apparatus used to reproduce the signal can also become very complicated.

OBJECTS AND SUMMARY OF THE INVENTION

Accordingly, it is an object of the present invention to provide a method and an apparatus for recording and reproducing an analog signal which can eliminate the above noted defects inherent in the prior art.

Another object of this invention is to provide an improved method and apparatus for recording an analog signal converted into PCM data and then recorded on a recording medium by a rotary head, and an improved method and apparatus for reproducing such PCM data.

A further object of this invention is to provide an improved method and apparatus for recording, and an improved method and apparatus for reproducing an analog signal in which there are free periods in which no recording or reproducing head traces the magnetic medium and during which additional data, such as, parity data and error-correcting code, are added to PCM data representing the analog signal, and such additional data are used for error correction after the PCM data has been reproduced by a head in contact with the medium.

In accordance with an aspect of the present invention, in recording an analog signal on a magnetic medium by means of at least two recording heads that periodically trace the magnetic medium, the analog signal is converted into a digital signal corresponding to a predetermined real-time period of said analog signal, the magnetic medium is traced or scanned with the head in a scanning period which includes at least one recording period shorter than the duration of the corresponding real-time period of the converted analog signal and at least one free period in which all of the heads are free of the tape, additional digital data, for example, parity and error correction code data, are added to the digital data representing the analog signal for a real time signal period for forming a composite digital signal and the composite digital signal is time-base compressed to a period substantially equal to the recording period for recording on the magnetic medium during the recording period. In reproducing the signal thus recorded the medium is traced by at least two heads during a scanning period that includes at least two free periods when all of the heads are free of the tape. The parity and error-correction code data are used during the free periods to correct the PCM signal, which is then time-base expanded and converted into the analog signal.

The above, and other objects, features and advantages of the present invention, will become apparent from the following detailed description of illustrative embodiments thereof to be read conjunction with the accompanying drawings.

BRIEF DESCRIPTION OF THE DRAWINGS

FIG. 4 consisting of FIGS. 4A-1 through 4M-2 illustrates the operation of the recording apparatus shown in FIG. 3 and of an apparatus for reproducing an analog signal recorded using the apparatus shown in FIG. 3;

FIG. 6 consisting of FIGS. 6A-1 through 6M-2 illustrates the operation of another embodiment of the method and apparatus for recording and reproducing an analog signal according to the present invention.

DETAILED DESCRIPTION OF PREFERRED EMBODIMENTS

Figure 1:
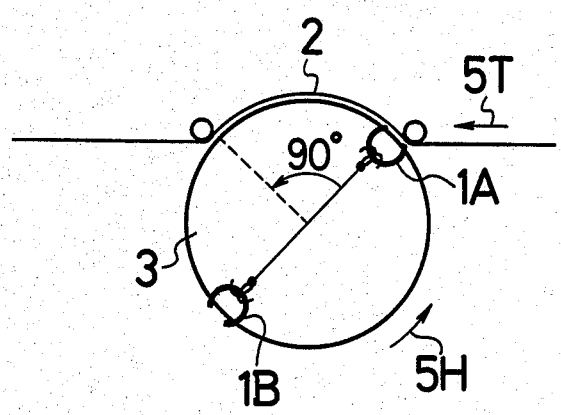
FIG. 1 schematically illustrates a rotary head assembly used in the method and apparatus for recording and reproducing an analog signal according to the present invention.
Figure 2:
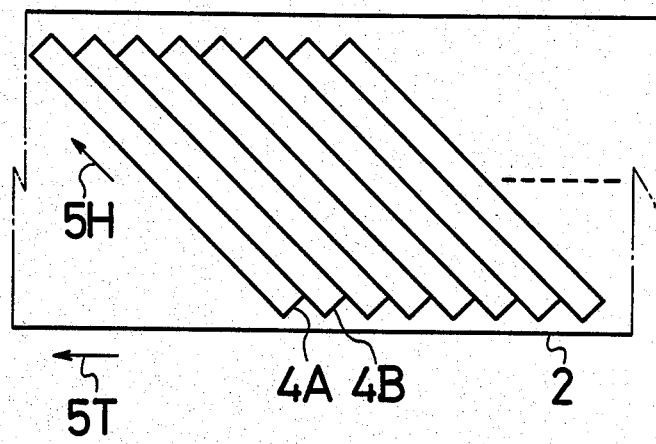
FIG. 2 illustrates the orientation of tracks recorded on a tape using the rotary head assembly shown in FIG. 1.

FIG. 1 schematically shows a rotary head assembly, used in the present invention, that includes two magnetic heads 1A and 1B mounted on a rotating drum. The rotary magnetic heads 1A and 1B are diametrically opposed, having an angular distance of 180° therebetween, while a magnetic medium such as a tape 2 is wrapped around the peripheral surface of a tape guide drum 3 with an angular range of 90°. The rotary heads 1A and 1B are rotated at 30 revolutions per second in the direction of the arrow 5H, to define a "scanning period" of the rotating drum of 1/30 second. The magnetic tape 2 is transported at a predetermined speed in the direction of the arrow 5T. The heads 1A and 1B thus consecutively record a signal in two adjacent magnetic tracks 4A and 4B, respectively, as shown in FIG. 2.

With the rotary head assembly shown in FIG. 1, free periods, during which the two rotary heads 1A and 1B are both out of contact with the magnetic tape 2, take place. In accordance with the present invention, those free periods are utilized to add additional digital data, such as parity data and an error correction codes to the pulse-code-modulated (PCM) data representing an analog signal.

Figure 3:
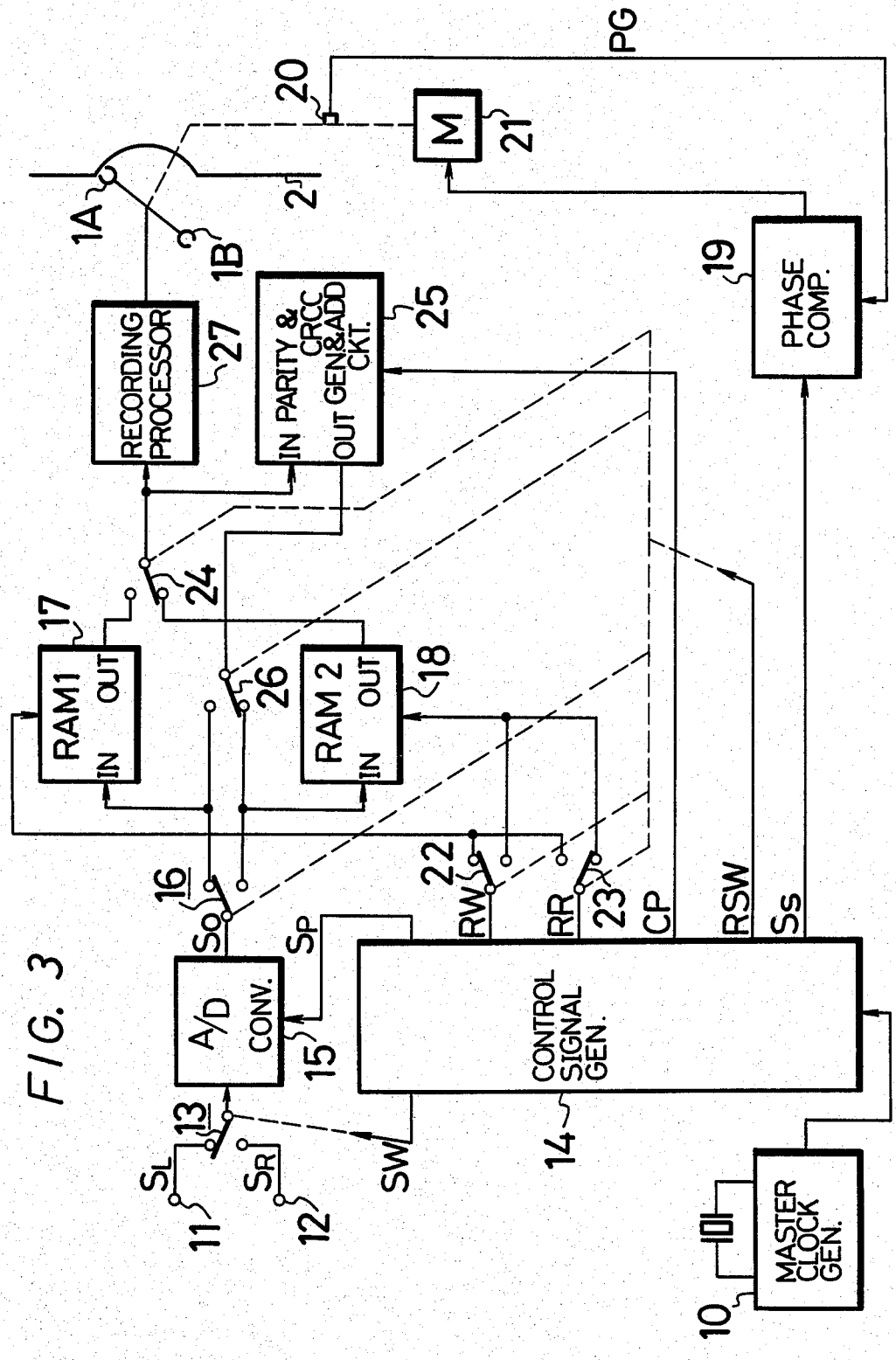
FIG. 3 is a block diagram illustrating one preferred embodiment of an apparatus for recording an analog signal according to the present invention.

FIG. 3 shows an example of the recording system in which an analog audio signal is recorded as a two-channel signal, comprising right and left audio channels.

A left-channel analog audio signal $S_L$ is applied through an input terminal 11 to one input terminal of a switching circuit 13. A right-channel analog audio signal $S_R$ is applied through an input terminal 12 to the other input terminal of the switching circuit 13. The switching circuit 13 is changed over alternately by a switching signal SW from a control signal generator circuit 14 and the output therefrom is supplied to an analog-to-digital (A/D) converter 15. The control signal generator circuit 14 also generates, besides the switching signal SW, various control signals, which are described below, using a master clock signal supplied from a master clock signal generator circuit 10.

The switching signal SW for the switching circuit 13 has a frequency matching the sampling frequency of the A/D converter 15, for example, 44.1 kHz, and is a square wave signal with a duty factor of 50%, as shown in FIG. 4A-1. In this case, the switching circuit 13 is alternately changed over by the switching signal SW so as to select the left-channel analog signal $S_L$ when the switching signal SW is at high level and the right-channel analog signal $S_R$ when the switching signal SW is at low level.

A sampling signal SP, derived from the control signal generator circuit 14, controls the sampling operation in the A/D converter 15. By this sampling signal SP, the left-channel and right-channel audio signals are respectively sampled and the sampled data is converted in a A/D converter 15 to a PCM signal $S_O$ of, for example, 16 bits per one word FIG. 4B-1 shows the output signal $S_O$ of the A/D converter 15 in which reference letters $L_0, L_1, L_2, \ldots$ respectively denote one word of the left-channel audio PCM signal, while letters $R_0, R_1, R_2, \ldots$ respectively denote one word of the right-channel audio PCM signal.

The output signal $S_O$ from the A/D converter 15 is supplied through an input switching circuit 16 to input terminals of random-access memories (RAM) 17 and 18, each of which is used for the addition of redundant data and for interleaving, which are described below. The switching circuit 16 is controlled by a main control signal RSW (FIG. 4E) with a frequency of 30 Hz, having a low level for a 1/60-second period TA and a high level for a 1/60-second period TB.

The main control signal RSW is derived from the control signal generator circuit 14 and is synchronized with the rotation of the rotary heads 1A and 1B. The control signal generator circuit 14 generates a synchronizing signal $S_S$ with a frequency of 30 Hz which is supplied to a phase comparator circuit 19. A pulse signal PG derived from a pulse generator 20, which generates one pulse for each scan or revolution of the rotating drum carrying the heads 1A and 1B, is also supplied to the phase comparator circuit 19. The comparator 19 compares the phases of the signals $S_S$ and PG and generates an error signal representing the phase difference exhibited by the signals $S_S$ and PG. The error signal is supplied to a motor 21, which rotates the heads 1A and 1B. Thus the rate of rotation of the heads 1A and 1B is precisely controlled so that the heads trace the tape 2 with the proper phase relation to the signal RSW. In this case, the synchronizing means just described operates so that, during the 1/120-second period (corresponding to an angular range of the rotating drum of 90°) in the latter half of the period TA (corresponding to an angular range of 180°), the rotary head 1A traces the magnetic tape 2. During the 1/120-second period in the latter half of the period TB, the rotary head 1B traces the magnetic tape 2. That relationship is illustrated in FIGS. 4E, 4G and 4H.

As shown in FIGS. 4D and 4E, during the period TA the signal $S_O$ is supplied to the data input terminal IN of the RAM 18. As shown in FIGS. 4C and 4E, during the period TB, the signal $S_O$ is supplied to the input terminal IN of the RAM 17.

The control signal generator circuit 14 also generates a write control signal RW and a read control signal RR for the RAMs 17 and 18. The control signals RW and RR are selectively supplied through switching circuits 22 and 23 to the control terminals of the RAMs 17 and 18. The switching circuits 22 and 23 are both controlled by the signal RSW. That is, during the period TB, when the signal RSW assumes its upper level, the switching circuits 22 and 23 occupy the positions as shown in FIG. 3; during the period TA, when the signal RSW assumes its lower level, the states of the switching circuits 22 and 23 are opposite to those shown in FIG. 3. Thus, during the period TA, the signal $S_O$, which represents the input analog signal for a period equal to one-half the scanning period of the rotating drum (that is, the scanning period divided by the number of recording heads), is written in the RAM 18 as controlled by the write control signal RW. Likewise, during the period TB, the signal $S_O$ is written in the RAM 17 as controlled by the write control signal RW.

Thus, the PCM signal $S_O$ is written in the RAMs 17 and 18 during alternating 1/160-second periods, where each such period contains 1,470 samples of the analog signal. That is, as shown in FIG. 4B-1, 1,470 words, comprising 735 words ($L_0$ to $L_{734}$) representing the left-channel audio signal and 735 words ($R_0$ to $R_{734}$) representing the right-channel audio signal, are written into the RAMs 17 and 18 during a period representing the scanning period of the rotating drum.

The PCM data written in the RAMs 17 and 18 are respectively added with generated parity data and a cyclic redundancy check (CRC) code during the respective first half-periods of the periods TA and TB. As illustrated in FIGS. 4C, 4D, 4E, 4G and 4H, those are the free periods in which the rotary heads 1A and 1B are both out of contact with the magnetic tape 2. Then, during the second half-periods of the periods TA and TB during which the respective heads are in their recording periods (compare FIGS. 4E, 4G and 4H), the PCM data appended with these redundant data, which together comprise a composite digital signal, are recorded on the magnetic tape 2 by the rotary heads 1A and 1B (see FIGS. 4C and 4D).

To provide the additional data, the output signals from the RAMs 17 and 18 are selectively supplied through a switching circuit 24 to a digital data generating means that includes a parity data and CRC code generation and addition circuit 25. The output signal of the parity data and CRC code generation and addition circuit 25 is selectively fed back to the input terminals IN of the RAMs 17 and 18 via a switching circuit 26. Both the switching circuits 24 and 26 are controlled by the main control signal RSW in synchronism with the switching circuits 16, 22 and 23. The control signal generator circuit 14 also generates a control signal CP (see FIG. 4F) with a frequency of 60 Hz. The control signal CP has a high level during the first half of the periods TA and TB as shown in FIG. 4F. The control signal CP is supplied to the parity data and CRC code generation and addition circuit 25 in which, during the period when the control signal CP is at its high level, the parity data and the CRC code are generated and then added to the incoming PCM data. That is, the PCM data written in the RAM 18 during the period TA is supplied through the switching circuit 24 to the parity data and CRC code generation and addition circuit 25 in the first half of the next period TB, because the switching circuits 23, 24 and 26 are in the positions shown in the FIG. 3 during the period TB. Thus, during the first half of the period TB, the parity data and the CRC code are generated and then added to the input to the circuit 25 and the data, with the added parity data and CRC code, is supplied through the switching circuit 26 to the RAM 18 and thereby stored again in the RAM 18 at the original address portion thereof. The same occurs in the RAM 17. The data stored in the RAM 17 during the period TB is, during the first half period of the subsequent period TA, added with the parity data and the CRC code generated in the parity data and CRC code generation and addition circuit 25 and is then fed back to the RAM 17 and again stored therein at the predetermined address of the RAM 17.

After the generation and addition of the parity data and the CRC code, the PCM data comprises blocks, each consisting of 6 words, with the parity data P and Q and the CRC code added to each of the blocks, as shown in FIG. 4A-2. As shown in FIGS. 4A-2 and 4B-2, the data is in a interleaved relationship with the PCM data representing 1/60-second of the analog signal (representing ½ of the total scanning period) which is then recorded as one track on the tape in 1/120-second, as is described below.

The signal, in the state in which the parity data and the CRC code have been added to the audio PCM data written in the RAMs 17 and 18 as described above, is read out from the RAM 17 during the second 1/120-second half of the period TA, during which the rotary head 1A comes into contact with the magnetic tape 2 (see FIG. 4G). This read-out signal is supplied through a recording processor 27 to the rotary head 1A and thereby recorded on the magnetic tape 2 to form one track 4A. During the second 1/120-second half of the period TB, during which the rotary head 1B is in contact with the magnetic tape 2 (see FIG. 4H), the signal is read out from the RAM 18 and is then supplied through the recording processor 27 to the rotary head 1B and thereby recorded on the magnetic tape 2 to form one track 4B.

In this case, the data of two channels 1/60-second long are respectively recorded during the 1/120-second periods. Thus, the digital data are time-base compressed into about ½ the time occupied by the original real-time analog signal. During the second 1/120-second half-periods of the periods TA and TB, the data stored in the RAMs 17 and 18 are respectively supplied through the recording processor 27 to the rotary heads 1A and 1B, while during the first 1/120-second half-periods the rotary heads 1A and 1B are both out of contact with the magnetic tape 2 and the generation and addition of the parity data and the CRC code are performed in the circuit 25.

In the recording processor 27, as shown in FIG. 4B-2, one block of data has added to it a block synchronizing signal SYNC and a block address data ADS. The data to be recorded as one track are arranged into one data segment to which is added a preamble signal and a postamble signal described below. Here, since one block is formed of 6 words, the number of data blocks contained in one data segment is 245 (1470 words/6 words per block). Thus, the data read out during a 1/120-second period consists of 245 data blocks from a first block $B_0$ to a last block $B_{244}$, as shown in FIG. 4B-2. To the beginning and end of the 245 blocks are added the preamble signal, which has a clocking function used in extracting the data upon playback, and the postamble signal, which indicates the end of one track of data. The recording processor 27 also modulates the PCM data into a signal suitable for recording, for example, a signal in which the DC component has been reduced as much as possible.

Figure 5:
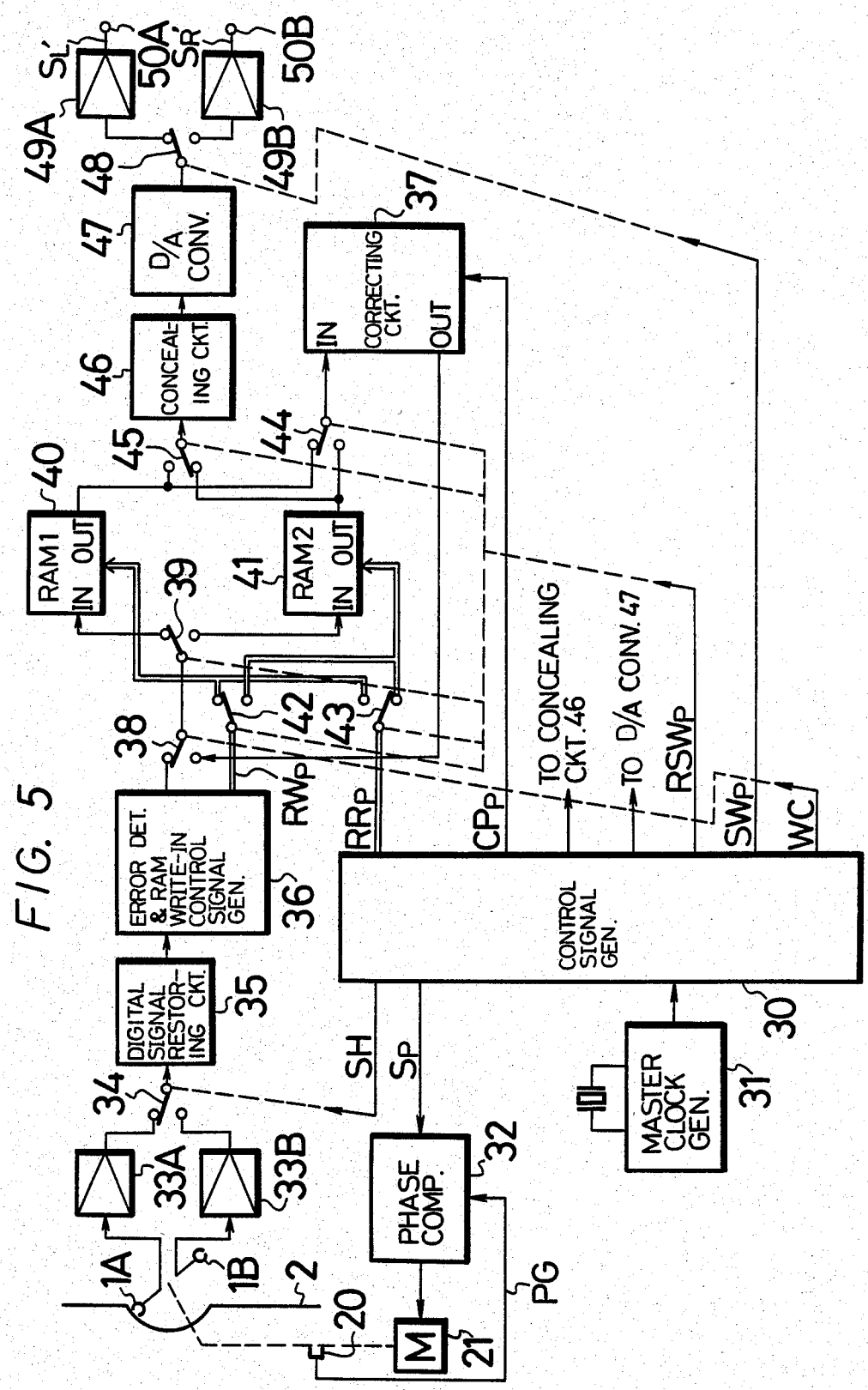
FIG. 5 is a block diagram illustrating one preferred embodiment of an apparatus for reproducing an analog signal according to the present invention that operates in accordance with FIG. 4.

FIG. 5 illustrates the reproducing system. FIGS. 4G to 4M are timing charts that illustrate the operation of the playback system.

In the playback operation, similar to the recording operation, the rotary reproducing heads 1A and 1B are controlled to rotate in synchronism with a signal $S_p$ with a frequency of 30 Hz generated from a control signal generator circuit 30 using a master clock signal generator circuit 31. Specifically, the pulse generator 20, for producing one pulse per one revolution of the motor 21, generates the output signal PG with the frequency of 30 Hz and supplies the same to a playback phase comparator circuit 32 in which the phases of the signal PG and of the signal $S_p$ are compared. An error signal generated by the phase comparator 32 controls the motor 21. The signals $S_p$ and PG control the motor 21 so that during the first 1/120-second half-periods of the 1/60-second periods TC and TD, defined by a 30 Hz switching signal $RSW_P$ (FIG. 4L), the rotary head 1A and 1B, respectively, come into contact with the magnetic tape 2. (See FIGS. 4G, 4H and 4L.) That is, the head 1A traces the tape during the first half-period of the period TC as shown in FIGS. 4G and 4L, while the head 4L traces the tape during the first half-period of the period TD as shown in FIGS. 4H and 4L.

The playback outputs from the reproducing heads 1A and 1B are respectively supplied through amplifiers 33A and 33B to the input terminals of a switching circuit 34. The switching circuit 34 is controlled by a signal SH (FIG. 4I) with a frequency of 30 Hz. More precisely, during the period in which the signal SH is at high level, the switching circuit 34 is in the state shown in FIG. 5 to select the output signal of the amplifier 33A, while during the period in which the signal SH is at low level, the switching circuit 34 is changed over to select the output of the amplifier 33B. The rising and falling points of the switching signal SH are not critical and may occur any time as long as the switching circuit 34 is connected with amplifier 33A when head 1A is tracing the tape and with amplifier 33B when head 1B is tracing the tape.

As stated above, from the switching circuit 34 is extracted a signal in which the outputs of the rotary heads 1A and 1B are alternately arranged in sequence.

This extracted signal is supplied to a digital signal restoring circuit 35 to be reconverted to a digital signal comprising "0" and "1" bits and is then fed to an error detection and RAM write-in control signal generator circuit 36.

In the circuit 36, the parity data P and Q and the CRC code are employed to detect errors and, on the basis of the address data contained in each block, a write address and write timing signal $RW_P$ for the two RAMs 40 and 41 are generated.

The error-detected PCM data is written in the two RAMs 40 and 41 during the first half-periods of the periods TC and TD, respectively, and is then error-corrected during the second half-periods thereof. More particularly, a switching circuit 38, for controlling the write-in period and the error-correction periods, is controlled by a 60 Hz signal WC (FIG. 4M) derived from the control signal generator circuit 30. The signal WC is at high level during the first 1/120-second half-periods of the periods TC and TD and at low level during the second 1/120-second half-periods thereof. During that time, the switching circuit 38 is connected to the output side of the circuit 36. When the signal WC is at the lower levels the switching circuit 38 is connected to the output side of an error correction circuit 37. The fixed terminal of the switching circuit 38 is selectively supplied through a switching circuit 39 to the RAMs 40 and 41.

Meanwhile, the write address and write-in timing signal $RW_P$ from the circuit 36 is selectively supplied to the RAMs 40 and 41 by a switching circuit 42. The control signal generator circuit 30 also supplies a read-out control signal $RR_p$ for the RAMs 40 and 41. This read-out control signal $RR_p$ is selectively fed to the RAMs 40 and 41 by a switching circuit 43. The output signals of the RAMs 40 and 41 are selectively supplied to the input terminal IN of the error correction circuit 37 by a switching circuit 44. The output signals of the RAMs 40 and 41 are also selectively fed through a switching circuit 45 to a concealment or amendment circuit 46. The switching circuits 39, 42, 43, 44 and 45 are all controlled by the 30 Hz switching signal $RSW_p$. The switching circuits 39, 42, 43, 44 and 45 are all connected as shown in FIG. 5 during the period TC in which the switching signal $RSW_p$ is at a high level, while during the period TD, in which the switching signal $RSW_p$ is at a low level, they are connected in a state opposite to that shown in FIG. 5.

Accordingly, after errors in the output signal of the rotary head 1A have been detected by the circuit 36, the output signal is written in the predetermined address of the RAM 40, in response to the write-in address and write-in timing signal $RW_p$ supplied from the circuit 36, during the first half-period of the period TC. Subsequently, during the latter half-period of the period TC, the switching circuit 38 is changed by the signal WC to occupy the position in which the output from the error correction circuit 37 is written in the RAM 40. During the period TC, the switching circuit 44 is connected as shown in FIG. 5 to permit the output of the RAM 40 to be supplied to the error correction circuit 37. Thus, the parity data P and Q and the CRC code are employed by the error correction circuit 37 to correct the error-detected data and the thus error-corrected data is again written in the RAM 40. In the RAM 41, during the first half-period of the period TD, the data is written in the RAM 41 and during the second half-period thereof, that data is error-corrected and the error-corrected data is written in the RAM 41 again.

The error-corrected reproduced data which were written in the RAMs 40 and 41 are time-base expanded to occupy substantially twice the period of the written data and read out from the RAMs 40 and 41 by the read-out control signal $RR_p$ from the control signal generator circuit 30. That is, by the signal $RSW_p$, the switching circuit 43 is connected to the RAM 41 during the period TC and is then connected to the RAM 40 during the period TD. As a result, the RAM not in the write-in mode is in the read-out mode and the data therein is read-out. The RAM 41 is read out during the period TC and the RAM 40 is read out during the period TD.

The data words dispersed within one data segment by the interleaving process upon recording are deinterleaved by controlling the write address of the RAMs 40 and 41 upon playback. The read-out data words are thus reconverted into the original arrangement.

The RAMs being read out are selectively changed over by the switching circuit 45, as controlled by the signal $RSW_p$, and the signals therefrom supplied to a concealment circuit 46, in which the data that could not be fully error-corrected is error-concealed. This concealment operation can use a pre-hold technique, which is well-known in the art.

The output from the concealment circuit 46 is such that left- and right-channel data appear at every other word, as in FIG. 4A-1. This output is reconverted into the analog signal in a digital-to-analog (D/A) converter 47. The analog signal, reconverted from the digital signal, is supplied to a switching circuit 48. The switching circuit 48 is alternately connected to two output terminals by a 44.1 KHz signal $SW_p$ similar to the switching signal SW used for recording, whereby the left- and right-channel audio signals $S_L$ and $S_R$ are respectively developed through amplifiers 49A and 49B at output terminals 50A and 50B.

Thus, using the present invention, in recording the intervals during which the rotary heads 1A and 1B are both free of the magnetic tape 2, the redundant data such as the parity data and the CRC code can be added to the data of respective channels. Then, in reproducing the free periods can be used for error correction. In that way the present invention allows the use of parity data and error correction codes without requiring a large number of buffer circuits.

In the embodiment described above, the audio signal is recorded with the right-channel and left-channel signals mixed in one track, which can be disadvantageous in certain circumstances. The present invention is capable of being incorporated in an embodiment in which right-channel and left-channel signals are recorded in alternating tracks on the tape.

FIG. 6 illustrates the operation of such an embodiment of the present invention. In this alternate embodiment the recording and reproducing apparatus are substantially the same as those shown in FIGS. 3 and 5. The difference lies in the frequency of the switching signal RSW for operating the RAMs 17 and 18 used in the recording apparatus and the frequency of the switching signal $RSW_p$ for operating the switching circuits 39, 42, 43, 44 and 45 in the reproducing or playback apparatus. In the first embodiment, the frequency of the signals RSW and $RSW_p$ was 30 Hz; in this second embodiment the frequency of the signals RSW' and $RSW_p'$ is 15 Hz, as shown in FIG. 6.

In this second embodiment, the left-channel signal $S_L$ and the right-channel signal $S_R$ shown in FIG. 3 are applied to the input terminals 11 and 12 of the switching circuit 13 which is switched by the switching signal SW (see FIG. 6A-1) with a frequency of 44.1 kHz. The 5 samples of the analog signal thus obtained are then supplied to the A/D converter 15. The data to be stored in the RAMs 17 and 18 represents a read-time period of the analog signal that is 1/30-second long, which is the duration of the scanning period (that is, the time required for one revolution of the rotating drum) because the switching circuit 16 is changed over by a signal RSW' with a frequency of 15 Hz. Thus, the periods TA' and TB', of 1/30-second, are twice as long as that of the corresponding periods TA and TB (see FIG. 4E). The number of words to be written in the RAMs 17 and 18 during each period TA' and TB' is, 1,470 (for the left-channel words from $L_0$ to $L_{1469}$) and 1,470 (for the right-channel words from $R_0$ to $R_{1469}$). (See FIG. 6B-1.) The switching circuits 22, 23, 24 and 26 are similarly controlled by the 15 Hz signal RSW'.

A 60 Hz control signal CP' supplied to the parity data and CRC code generation and addition circuit 25 is the same as the signal CP of the foregoing embodiment. During the 1/30-second period TB', in which the signal RSW' is at low level, the data of 1/30-second is written in the RAM 18. During the 1/30-second period TA', in which the signal RSW' is at high level, the data of 1/30-second is written in the RAM 17.

In the RAM 17 or 18 that is not in the write-in mode during the respective periods TA' and TB', during a first 1/120-second period (the first time during a half-cycle TA' or TB' of the signal RSW' the signal CP' is at a hgh level) of the first 1/60-second half-period PA of the periods TA' and TB', only the left-channel words are added with the generated parity data and the CRC code. During the second 1/120-second period (the first time during a half-cycle of the signal RSW' the signal CP' is at a low level) of the period PA, the left-channel words, appended with the parity data and the CRC code, are read out. That 1/120-second read-out period is the same period during which the rotary head 1A scans the magnetic tape 2 (FIGS. 6F and 6G), so that the read-out left-channel data are recorded on the magnetic tape 2 by the rotary head 1A to form the track 4A. During the first 1/120-second period of the 1/60-second period PB of the periods TA' and TB' (the signal CP' is at its second high level of a half-cycle TA' or TB' of the signal RSW'), only the right-channel words are added with the generated parity data and the CRC code. Subsequently, during the second 1/120-second period of the period PB' (the second time the signal CP' is at a low level during TA' or TB'), the right-channel data, with the added parity data and CRC code, are read out. That 1/120-second period equals in length the interval during which the rotary head 1B scans the magnetic tape 2 (See FIGS. 6F and 6H), so that the read-out right-channel data are recorded on the tape 2 by the rotary head 1B to form the track 4B.

In this way, in each of the separate tracks 4A and 4B is separately recorded only the left-channel or right-channel data. The data, similar to the first embodiment described above, consist of 245 blocks, $B_0(L)$ to $B_{244}(L)$, each having 6 words and formed only of left-channel data, and 245 blocks, $B_0(R)$ to $B_{244}(R)$, formed only of right-channel data. (See FIGS. 6A-2 and 6B-2.) Thus, the amount of data to be recorded in each track corresponds to 1470 words representing the analog signal, and the parity data, the CRC code, the SYNC and ADS blocks, the preamble and the postamble, which are the same as in the first embodiment.

The data thus recorded are reproduced by the use of the apparatus shown in FIG. 5. The rotary reproducing head 1A reproduces only left-channel data, while the reproducing head 1B produces only right-channel data, respectively, as shown in FIGS. 6G and 6H. The output signals therefrom are fed to amplifiers 33A and 33B and, through the switching circuit 34 controlled by the signal SH (see FIG. 6I), to the digital signal restoring circuit 35. Thus, instead of each 1/120-second data segment representing both left- and right-channel data, as in the first embodiment of the present invention, each represents only the left-channel or right-channel signal.

The switching circuits 39, 42, 43, 44 and 45 are controlled by a 15 Hz signal $RSW_p'$ (see FIG. 6L). During a first 1/30-second period TC', in which the signal $RSW_p'$ is at high level, the switching circuits occupy the positions shown in FIG. 5. During a second 1/30-second half-cycle TD' of the signal $RSW_p'$, they occupy positions opposite those shown in FIG. 5. Thus, in the RAM 40 one track of left-channel and one track of right-channel data are written during the period TC' (see FIGS. 6J and 6L). In the RAM 41 one track of left-channel data and one track of right-channel data are written during the period TD' (see FIGS. 6K and 6L).

The switching circuit 38 and the error correcting circuit 37 are controlled, respectively, by a signal WC' similar to the signl WC and a signal $CP_p'$ similar to the signal $CP_p$. Consequently, during the first 1/120-second period of each 1/30-second period TC' or TD', the left-channel data are written in the RAM 40 or 41. During the second 1/120-second period, the left-channel data are error-corrected. Then, during the third 1/120-second period of the period TC' or TD', the right-channel data are written in the RAM 40 or 41 and during the fourth and last 1/120-second period thereof, the right-channel data are error-corrected.

As stated above, the left-channel and right-channel data are stored in the RAMs 40 and 41. The error-corrected data are reassembled in their original order (See FIG. 6B-1) and are read out from the RAMs 40 and 41 by the read-out control signal $RR_p$ from the control signal generator circuit 30 during the 1/30-second period TD' or TC', respectively. The uncorrected data are then error-concealed in the error concealment circuit 46 and are reconverted to the analog signal by the D/A converter 47. Thereafter, the analog signal thus reconverted is separated into a right-channel and a left-channel signal by the switching circuit 48 and delivered through the amplifiers 49A and 49B to the output terminals 50A and 50B as the left-channel analog signal $S'_L$ and the right-channel analog signal $S'_R$, respectively.

In the embodiment of the present invention described in connection with FIG. 6, since the right-channel and left-channel signals are recorded on separate tracks of the tape 2, it is possible to easily reproduce only the left-channel or right-channel audio signal. And using the 1/120-second periods during each scanning period of 1/30-second in which the rotary heads 1A and 1B are both free of the magnetic tape 2, the generation and the addition of the parity data and the CRC code and the use thereof for error correction can be performed without the necessity of using buffer circuits as in the prior art.

The present invention thus provides a method and an apparatus by which an analog audio signal is converted to PCM data and then recorded. In this case, since the maximum frequency audible by humans is 20 kHz, the sampling frequency is chosen as 40 kHz or above. Besides, if the PCM signal is formed of 16 bits per one word, as in the just-described embodiments, the bit rate at which the signal is recorded, considering the addition of the parity data and the error-correction code, and the other information added to the signal, the bit rate at which the signal is recorded is no more than $3 \times 10^6$ bits per second. Therefore, when the signal is recorded on the tape by the rotary heads, if the signal wavelength which can effectively be recorded and reproduced is taken into consideration, it is seen to be possible to use a tape the width of which is narrower than that of the tape used in standard VTRs, with the advantage that the tape cassette can be made smaller.

Moreover, as is shown in FIG. 1, according to the present invention, the wrapping angle of the tape 2 on the drum 3 is less than 180°. Therefore, the tape can be loaded onto the apparatus without extracting the tape from the tape cassette as is required in standard VTRs. Rather, a concave portion corresponding to the wrapping angle can be formed on, for a cassette half-member and the drum inserted into this concave portion to thereby easily wrap the tape on the drum for the required angular range. Furthermore, since the width of tape may be made narrow and the bit rate of the signal to be recorded made low, the angle of inclination of the tape relative to the rotation direction of the head when the tape is wound around the drum can be made large, thereby reducing the diameter of the rotary head drum. The rotary head drum can be made about 3 cm in diameter, for example. The apparatus of the present invention can thus be made quite compact and is suitable for use in a portable tape recorder.

The above description is based on two particular embodiments of the invention, but it will be apparent that many modifications and variations could be effected by one skilled in the art without departing from the spirit of the invention. For example, the angle through which the tape is wrapped on the drum is not necessarily limited to 90°. It is sufficient that the tape be wrapped on the drum with an angular range that allows the heads to have free periods in which the heads do not contact the tape. In any case, it is intented that the scope of the invention be defined solely by the appended claims.

What is claimed is:

1. A method of recording an analog signal on a magnetic medium using at least two recording heads that periodically trace the magnetic medium, the method comprising the steps of:
   providing a digital signal corresponding to a predetermined real time signal period of the analog signal;
   tracing the magnetic medium with the heads to provide at least one recording period during each said predetermined real time signal period, the duration of said at least one recording period being shorter than said real time signal period to provide at least one free period when all of the heads are free of the medium;
   adding to said digital signal during said free period additional digital data for providing a composite digital signal; and
   time-base compressing said composite digital signal to a period substantially equal to said recording period for recording the compressed composite digital signal on the magnetic medium during said recording period.

2. A method of recording an analog signal as in claim 1; in which said heads are equally spaced rotating magnetic recording heads that define a scanning period corresponding to the period of rotation of the heads and provide a series of consecutively formed tracks on a magnetic tape moving thereby, each said scanning period comprises a like plurality of equal duration recording periods alternating with a like plurality of equal duration free periods and the durations of said recording periods and said free periods are substantially equal.

3. A method for recording an analog signal as in claim 2; in which the analog signal is provided in two separate channels simultaneously and two recording heads are used; and in which said digital signal comprises a pulse code modulated (PCM) signal representing both of the channels of the analog signal, and said additional data comprises parity data and a cyclic redundancy check code.

4. A method of recording an analog signal as in claim 3; further comprising the steps of:
   recording, by one of said rotating heads during a recording period thereof, the PCM signal corresponding to a real time signal period beginning substantially when said head completes the next-previous recording period and is thereby free of said tape and having a duration substantially equal to one-half of said scanning period; and
   writing said PCM signal into memory means during said real time signal period; and in which
   said adding of said additional digital data to said PCM signal is effected during said free period next-following said real time signal period; and
   said time-base compressing of said composite digital signal and reading of said composite digital signal from said memory means occur during said next-following recording period for recording on the tape by said head.

5. A method of recording an analog signal as in claim 4; in which said PCM signal is written into different memory means during alternating real time signal periods of the analog signal.

6. A method of recording an analog signal as in claim 3; further comprising the step of recording said composite digital signal on the tape with data corresponding to said separate channels being recorded in alternating tracks, respectively.

7. A method of recording an analog signal as in claim 6; further comprising the steps of:
   recording, by said rotating heads during a scanning period, said PCM signal with a real time signal period beginning substantially when one of said heads completes the next-previous recording period thereof and is free of the tape and having a duration substantially equal to the duration of each said scanning period;
   writing said PCM signal into memory means during said real time signal period;
   separating said PCM signal into first-channel and second-channel digital data representing the analog signal from said respective channels;
   adding said additional digital data to said first-channel digital data to form a first-channel composite digital signal during the first free period immediately following the end of said real time signal period;

time-base compressing said first-channel composite digital signal and reading said first-channel composite digital signal from said memory means during the recording period next-following said first free period for recording on the tape by one of said heads;

adding said additional digital data to said second-channel digital data to form a second-channel composite digital signal during the second free period following said real time signal period; and time-base compressing said second-channel composite digital signal and reading said second-channel composite digital signal from said memory means during the recording period next-following said second free period for recording on the tape by the other of said heads.

8. A method of recording an analog signal as in claim 7; in which said real time signal period begins when a first one of said heads completes a recording period thereof;

said first-channel composite digital signal is recorded by said second head; and said second-channel composite digital signal is recorded by said first head.

9. A method of recording an analog signal as in claim 7; in which said PCM signal is written into different memory means during alternating real time signals periods.

10. A method of reproducing an analog signal which has been recorded by the method as in claim 1, and in which said additional data comprises an error correction code, the method comprising the steps of:

periodically tracing the magnetic medium with at least two reproducing heads in successive scanning periods during each of which all of said reproducing heads scan the medium once to provide a like plurality of reproducing periods during each scanning period in which said composite digital signal is reproduced from the medium, and a like plurality of free periods during each scanning period in each of which all of the reproducing heads are free of the medium;

correcting any errors in said reproduced composite digital signal by means of the respective error correction code during said free periods;

time-base expanding said corrected composite digital signal for reproducing said digital signal; and converting said digital signal into the corresponding analog signal.

11. A method of reproducing an analog signal as in claim 10; further comprising concealing any uncorrected errors in said time-base expanded digital signal prior to converting said digital signal into the corresponding analog signal.

12. Apparatus for recording an analog signal on a magnetic medium having at least two magnetic heads that periodically trace the magnetic medium, the apparatus comprising:

converting means for converting said analog signal, during successive predetermined real time signal periods thereof, into a corresponding digital signal;

guide means for guiding the medium past the heads to provide, for each of said real time signal periods, at least one recording period during which a head traces the medium and at least one free period in which all of said heads are free of the medium;

digital data generating means for supplying additional digital data added to said digital signal during said free period to form a composite digital signal;

compressing means for time-base compressing said composite digital signal to a period substantially equal to said recording period; and synchronizing means for supplying the compressed composite digital signal to the heads during said recording periods.

13. Apparatus for recording an analog signal as in claim 12; in which said at least two magnetic heads are rotary and equally spaced to define a scanning period corresponding to the period of rotation of the heads and to provide a series of consecutively formed tracks on one said medium which is in the form of a magnetic tape; and said guide means guides the tape past said rotating heads through an angular range substantially equal to 360° divided by twice the number of said heads so that each said scanning period comprises a like plurality of equal-duration recording periods alternating with a like plurality of equal-duration free periods having substantially the same duration as said recording periods.

14. Apparatus for recording an analog signal as in claim 13; in which there are two of said recording heads for recording an analog signal provided in two separate channels;

said converting means provides a pulse-code-modulated (PCM) signal representing both of the channels of the analog signal; and said additional digital data comprises parity data and a cyclic redundancy check code.

15. Apparatus for recording an analog signal as in claim 14; in which said compressing means includes memory means for storing and time-base compressing digital information;

said converting means provides said PCM signal with a real time signal period beginning substantially when one of said heads completes the next-previous recording period thereof and is free of the tape and having a duration substantially equal to one-half of said scanning period;

said digital data generating means adds said parity data and cyclic redundancy check code to said PCM signal for a real time signal period and writes the resulting said composite digital signal into said memory means during said free period next-following said real time signal period; and said memory means time-base compresses said composite digital signal to a period having substantially the same duration as said recording period and reads said composite digital signal to said one head during said next recording period thereof.

16. Apparatus for recording an analog signal as in claim 14; in which said memory means includes a pair of random-access memories for receiving the PCM signals corresponding to alternating real time signal periods.

17. Apparatus for recording an analog signal as in claim 16; further comprising processing means for receiving said time-base compressed composite digital signal and adding thereto supplementary digital data at the beginning and end thereof prior to recording on the tape.

18. Apparatus for recording an analog signal as in claim 14; in which said compressing means includes memory means for storing and time-base compressing digital information;

said converting means provides said PCM signal with a real time signal period beginning substantially when one of said heads completes the next-previous recording period thereof and is free of the tape and having a duration substantially equal to said scanning period;

said digital data generating means adds said parity data and cyclic redunancy check code to said PCM signal and writes the resulting composite digital signal into said memory means during said free periods in the next-following real time signal period; and said memory means arranges said PCM signal into first-channel data and second-channel data for the separate addition thereto of said parity data and cyclic redundancy check code, time-base compresses said composite digital signals and reads said first-channel composite digital signal during the first recording period in the next-following real time signal period and reads said second-channel composite digital signal during the second recording period in said next-following real time signal period, whereby said tracks on the tape alternately contain the two channels of the analog signal.

19. Apparatus for recording an analog signal as in claim 18; wherein said memory means includes a pair of random-access memories for receiving said PCM signals corresponding to alternating real time signal periods.

20. Apparatus for recording an analog signal as in claim 19; further comprising processing means for receiving said time-base compressed digital signal and adding thereto supplementary digital data at the beginning and end thereof.

21. Apparatus for reproducing an analog signal which has been recorded as a corresponding digital signal for successive predetermined real time signal periods appearing in time-base compressed form in a composite digital signal along with parity and error correction data in corresponding tracks on a record medium, comprising:

at least two reproducing heads that periodically scan the magnetic medium to define a scanning period during which all of the heads scan the medium once;

reproducing guide means for guiding the medium past the heads to provide, during each said scanning period, a number of reproducing periods equal to the number of said heads and during each of which one of the heads scans a track on the medium for reproducing the composite signal recorded therein and a corresponding number of free periods during each of which all of said heads are free of the medium;

error correction means operative during said free periods and using the error correction code contained in the reproduced composite digital signal for correcting errors contained in the latter;

memory means for time-base expanding said corrected digital signal to said real time signal period; and converting means for converting the time base expanded digital signal into the corresponding analog signal.

22. Apparatus for reproducing an analog signal as in claim 21; in which said digital signal, as recorded is a PCM signal, and said memory means includes a pair of random-access memories for receiving the reproduced PCM signal during alternating reproducing periods.

23. Apparatus for reproducing an analog signal as in claim 22; further comprising concealing means for concealing non-corrected errors in said error-corrected PCM signal.

* * * * *